US012201086B2

(12) United States Patent
Chow et al.

(10) Patent No.: US 12,201,086 B2
(45) Date of Patent: Jan. 21, 2025

(54) BREAKAWAY BUCKLE DEVICE FOR A PET COLLAR

(71) Applicant: Pets at Home Asia Limited, Kowloon (HK)

(72) Inventors: Wai Sze Chow, Kowloon (HK); Oscar Ernesto Romero Navarro, Kowloon (HK); Rahmad Dani, Kowloon (HK)

(73) Assignee: Pets at Home Asia Limited, Kwun Tong (HK)

( * ) Notice: Subject to any disclaimer, the term of this patent is extended or adjusted under 35 U.S.C. 154(b) by 93 days.

(21) Appl. No.: 17/982,598

(22) Filed: Nov. 8, 2022

(65) Prior Publication Data

US 2023/0145756 A1 May 11, 2023

(30) Foreign Application Priority Data

Nov. 9, 2021 (HK) .......................... 32021042115.4

(51) Int. Cl.
*A01K 27/00* (2006.01)
*A44B 11/25* (2006.01)

(52) U.S. Cl.
CPC .......... *A01K 27/001* (2013.01); *A01K 27/005* (2013.01); *A44B 11/2592* (2013.01)

(58) Field of Classification Search
CPC .... A01K 27/00; A01K 27/001; A01K 27/002; A01K 27/003; A01K 27/005; B68B 5/00; B68B 5/06; B68B 51/02; B68B 51/04; A44B 11/2592
USPC ....................................................... 119/865
See application file for complete search history.

(56) References Cited

U.S. PATENT DOCUMENTS

| 3,540,089 | A | * | 11/1970 | Willard | ................ | A01K 27/005 |
| | | | | | | 119/776 |
| 3,704,633 | A | | 12/1972 | Iverson | | |
| 4,044,725 | A | * | 8/1977 | Miller | .................. | A01K 27/001 |
| | | | | | | 59/84 |

(Continued)

FOREIGN PATENT DOCUMENTS

| CN | 1466918 | 1/2004 |
| CN | 107019279 | 8/2017 |

(Continued)

OTHER PUBLICATIONS

"Cat Head Breakaway Buckles". Paracord Planet [online]. Oct. 21, 2021 [retrieved on May 15, 2024]. Retrieved from the Wayback Machine Internet Archive. <https://web.archive.org/web/20211021122810/https://www.paracordplanet.com/cat-head-breakaway-buckles/> (Year: 2021).*

(Continued)

*Primary Examiner* — Brady W Frazier
*Assistant Examiner* — Brook Victoria Schmid
(74) *Attorney, Agent, or Firm* — Renner, Kenner, Greive, Bobak, Taylor & Weber

(57) ABSTRACT

A breakaway buckle device for a pet collar. The breakaway buckle device includes a first buckle portion, a second buckle portion, and a coupling mechanism arranged to releasably couple the first buckle portion with the second buckle portion. The coupling mechanism can be manipulated to adjust a breakaway force required for the first buckle portion to break relatively away from the second buckle portion.

14 Claims, 18 Drawing Sheets

(56) References Cited

U.S. PATENT DOCUMENTS

| | | | | |
|---|---|---|---|---|
| 4,733,625 | A * | 3/1988 | Allen | F16G 15/04 |
| | | | | 114/247 |
| 5,322,037 | A * | 6/1994 | Tozawa | A01K 27/001 |
| | | | | 119/863 |
| 5,450,820 | A * | 9/1995 | Kirsch | A01K 27/005 |
| | | | | 119/865 |
| 5,771,843 | A * | 6/1998 | Karlin | A01K 1/06 |
| | | | | 24/635 |
| 6,776,638 | B2 * | 8/2004 | Thurston | H01R 13/623 |
| | | | | 439/923 |
| 2011/0174239 | A1 | 7/2011 | Fricker et al. | |
| 2017/0036007 | A1 * | 2/2017 | Hallisey | A61M 39/26 |
| 2018/0353832 | A1 * | 12/2018 | Taylor | A63B 69/0059 |
| 2019/0059331 | A1 | 2/2019 | Lai | |
| 2020/0163419 | A1 | 5/2020 | Jing | |

FOREIGN PATENT DOCUMENTS

| | | | | |
|---|---|---|---|---|
| CN | 209498786 | | 10/2019 | |
| CN | 211354106 | | 8/2020 | |
| JP | 03191732 | | 2/1993 | |
| WO | WO-2012101527 A1 * | | 8/2012 | A01K 27/005 |
| WO | WO-2015185873 A1 * | | 12/2015 | A01K 1/04 |

OTHER PUBLICATIONS

European Search Report in EP 22 20 6212.

* cited by examiner

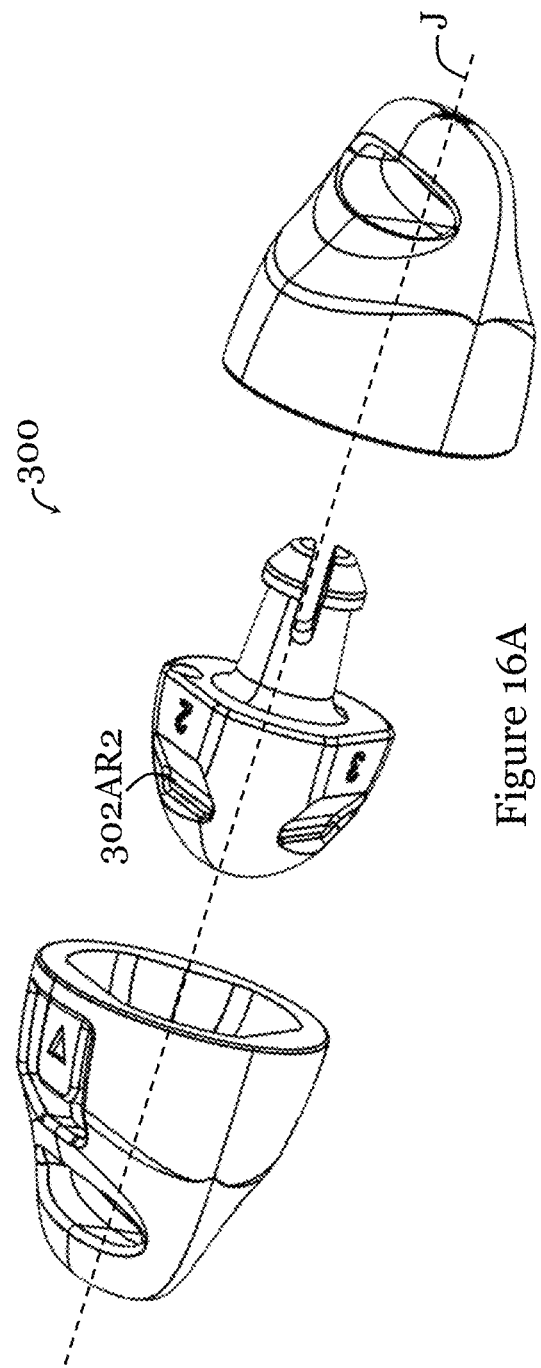
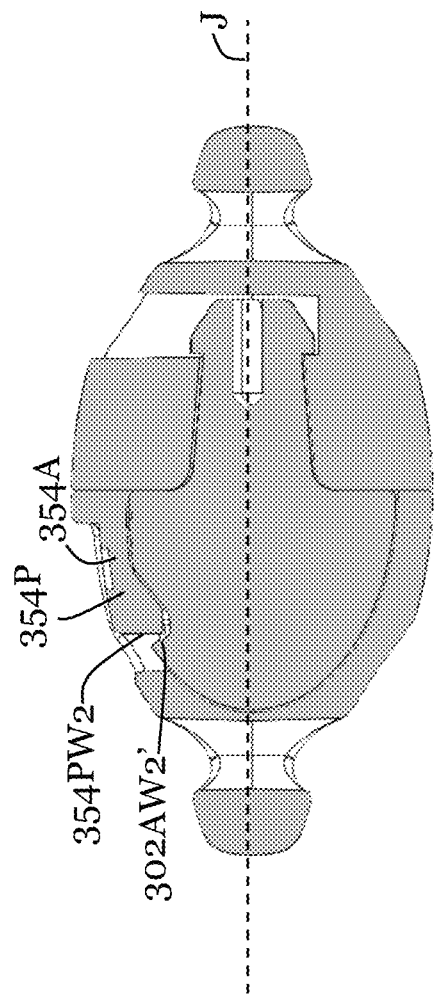
Figure 16A
Figure 16B

BREAKAWAY BUCKLE DEVICE FOR A PET COLLAR

TECHNICAL FIELD

The invention relates to a breakaway buckle device, in particular a breakaway buckle device for a pet collar.

BACKGROUND

Pet collar typically includes a band of material worn around the neck of a pet. The collar may be worn as an accessory, for example, to identify the pet and/or the pet's owners or to restrain the pet.

US20130333634A (U.S. application Ser. No. 13/495,488, filed on 13 Jun. 2012) discloses a pet collar. One disadvantage associated with the disclosed pet collar is that it may not be comfortably used with animals of different neck sizes (or the same animal at different ages with different neck sizes).

SUMMARY

In a first aspect, there is provided a breakaway buckle device for a pet collar. The breakaway buckle device comprises a first buckle portion, a second buckle portion, and a coupling mechanism. The coupling mechanism is arranged to releasably couple the first buckle portion with the second buckle portion. The coupling mechanism can be manipulated to adjust a breakaway force required for the first buckle portion to break relatively away from the second buckle portion. The breakaway buckle device may break away or break free to release the pet collar when a separation force applied to separate the first and second buckle portions reaches or exceeds the breakaway force. This ability to break away or break free reduces the risk of unintendedly injuring (e.g., choking) the animal wearing the pet collar.

The first buckle portion may be formed by a single component or multiple releasably connected or non-releasably connected components. The second buckle portion may be formed by a single component or multiple releasably connected or non-releasably connected components. In one example, the first buckle portion is a first buckle member. In one example, the second buckle portion is a second buckle member. In one example, the breakaway buckle device includes one or more further buckle portions.

The first buckle portion may include a connector for connection with a strap. The connector may be a looped portion. The second buckle portion may include a connector for connection with a/the strap. The connector may be a looped portion. The connectors of the first and second buckle portions may be arranged at opposite ends of the breakaway buckle device. Optionally, the breakaway buckle device further includes a strap connected with the connectors of the first and second buckle portions. The strap can be a band, a webbing, a tether, a belt, etc., made of materials such as fabric, plastic (e.g., rubber), leather, etc. The strap may be elastic. Or it may be substantially inelastic. The strap may be formed by one or more strap portions or members, which may be removably or non-removably connected with each other. The length of the strap may be adjustable.

Optionally, the first buckle portion is arranged to break relatively away from the second buckle portion along a breakaway axis. The breakaway axis may be generally parallel to or coaxial with a long axis (e.g., an axis along a length) of the breakaway buckle device. The breakaway axis may be generally parallel to or coaxial with a coupling axis for coupling the first and second buckle portions.

Optionally, the coupling mechanism comprises complementary engagement means (or arrangements, e.g., members, mechanisms, components, etc.) formed at (e.g., on or in) the first and second buckle portions.

The complementary engagement means may provide a predetermined number of (i.e., two or more) breakaway forces that can be adjusted in discrete steps. Alternatively, the complementary engagement means may provide infinite number of breakaway forces that can be adjusted steplessly.

Optionally, the complementary engagement means comprises male and female engagement features.

Optionally, the complementary engagement means comprises: a plurality of engagement portions arranged at one of the first buckle portion and the second buckle portion and a corresponding engagement portion arranged at another one of the first buckle portion and the second buckle portion. The corresponding engagement portion is arranged to selectively engage with one of the plurality of engagement portions to releasably lock the first buckle portion and the second buckle portion and to define a respective breakaway force.

In one example, the plurality of engagement portions are recesses and the corresponding engagement portion is a protrusion arranged to selectively extend at least partly into the respective recess. In another example, the plurality of engagement portions are protrusions and the corresponding engagement portion is a recess, each of the protrusions is arranged to extend at least partly into the recess.

Optionally, the first buckle portion comprises a first part and a second part movable relative to the first part, and the plurality of engagement portions are arranged at the second part.

Optionally, the second part is rotatable relative to the first part about a rotation axis.

Optionally, the rotation axis is generally perpendicular to the breakaway axis.

Optionally, the plurality of engagement portions comprise circumferentially spaced grooves defined by circumferentially spaced teeth, and the corresponding engagement portion comprises a projection on a resilient arm. The arm or the projection may be biased radially inwardly. The circumferentially spaced teeth may have different shapes and/or sizes to define circumferentially spaced grooves of different shapes and/or sizes such that different breakaway forces are defined.

Optionally, each of the respective teeth and the projection define a respective amount of contact or strength of contact, such that different breakaway forces are defined.

Optionally, the plurality of engagement portions comprise a plurality of pairs of circumferentially spaced grooves defined by circumferentially spaced teeth, each pairs of the circumferentially spaced grooves respectively comprises generally-diametrically-opposed first and second grooves; and the corresponding engagement portion comprises generally-diametrically-opposed projection pairs arranged on resilient arms for selectively engaging with each respective pair of the circumferentially spaced grooves. The first and second grooves of the same pair of circumferentially spaced grooves may have substantially the same shape and size.

Optionally, each respective pair of the circumferentially spaced teeth and the generally-diametrically-opposed projection pairs define a respective amount of contact or strength of contact, such that different breakaway forces are defined. The circumferentially distributed grooves and teeth may be distributed about the rotation axis Optionally, the rotation axis is generally parallel to the breakaway axis.

Optionally, the plurality of engagement portions comprise circumferentially distributed recesses and the corresponding engagement portion comprises a projection on a resilient arm. The circumferentially distributed recesses may be distributed about the rotation axis. The circumferentially distributed recesses may have different shapes and/or sizes.

Optionally, each of the circumferentially distributed recesses includes a respective end wall and the projection includes an end face arranged to be in generally-facing relationship selectively with each respective end wall; and each of the end wall extends generally along a respective first axis, the first axes of the end walls are different, the end face extends generally along a second axis, and an acute angle is defined between each respective first axis and the second axis. In one example, the acute angle is limited to between 10 to 80 degrees, between 20 to 70 degrees, between 40 to 70 degrees, etc. The second axis may be generally perpendicular to the breakaway axis.

Optionally, the breakaway buckle device further comprises an indicator arranged to provide an indication of a selected breakaway force associated with the first and second buckle portions. The indicator may be provided at the first buckle portion, at the second buckle portion, or partly at the first buckle portion and partly at the second buckle portion. The indicator may be a marker, sticker, etc. The indicator may be stamped, engraved, impressed, integrally formed (e.g., molded), e.g., on the corresponding first and/or second buckle portions. In one example, the indicator is at least partly visible in normal use of the breakaway buckle device. In another example, the indicator is hidden from view in normal use of the breakaway buckle device.

The first and second buckle portions may be additively manufactured. For example, the first and second buckle portions may be 3D printed using a 3D printer. The coupling mechanism may be additively manufactured. For example, the coupling mechanism may be 3D printed using a 3D printer. The first and second buckle portions and the coupling mechanism may be additively manufactured together.

In one example, the first and second buckle portions together define a face portion shaped to correspond to an outline of at least part of an animal. In one example the face portion is shaped to correspond to an outline of a body of an animal. In one example the face portion is shaped to correspond to the type of pet for which the breakaway buckle device is configured.

In a second aspect, there is provided a pet collar comprising the breakaway buckle device of the first aspect. The pet collar may be a cat collar, a dog collar, etc.

In a third aspect, there is provided a computer program that, when executed by an additive manufacturing machine, causes the additive manufacturing machine to create the breakaway buckle device of the first aspect. The additive manufacturing machine may be a 3D printer.

In a fourth aspect, there is provided a computer model of the breakaway buckle device of the first aspect. The computer model may be a CAD model.

In a fifth aspect, there is provided a method of making the breakaway buckle device of the first aspect. The method includes: processing a computer model of the breakaway buckle device using a processor associated with an additive manufacturing machine, and forming the breakaway buckle device of the first aspect using the additive manufacturing machine. The additive manufacturing machine may be a 3D printer. The computer model may be a CAD model. The method may further include creating or providing the computer model of the breakaway buckle device (if not yet created).

In a sixth aspect, there is provided a computer program product comprising instructions which, when the program is executed by a processor associated with an additive manufacturing machine, cause the additive manufacturing machine to carry out the method of the fifth aspect.

In a seventh aspect, there is provided an additive manufacturing machine, such as a 3D printer, comprising means for carrying out the method of the fifth aspect.

In an eighth aspect, there is provided a breakaway buckle device having one or more of the features of the breakaway buckle device of the first aspect. In this eight aspect, the breakaway buckle device may not be arranged for a pet collar but for other articles or applications such as backpacks, harnesses, bags, belts.

In a ninth aspect, there is provided a pet collar kit having a breakaway buckle device of the first aspect and one or more straps removably connectable with, or non-removably connected with, the breakaway buckle device. The one or more straps may include multiple straps. The straps may have different lengths, shapes, and/or forms, may be made of different materials, etc.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are, depending on context, used to take into account one or more of: manufacture tolerance, degradation, trend, tendency, imperfect practical condition(s), etc. Unless otherwise specified or implied, the terms "connected", "coupled", "mounted" or the like, are intended encompass both direct and indirect connection, coupling, mounting, etc.

BRIEF DESCRIPTION OF THE DRAWINGS

Embodiments of the invention will now be described, by way of example, with reference to the accompanying drawings in which:

FIG. 16A is an exploded view of the breakaway buckle device of FIG. 11 arranged at a second state (defining a second breakaway force);

FIG. 16B is a sectional view of the breakaway buckle device of FIG. 16A;

DETAILED DESCRIPTION

Figure 1:
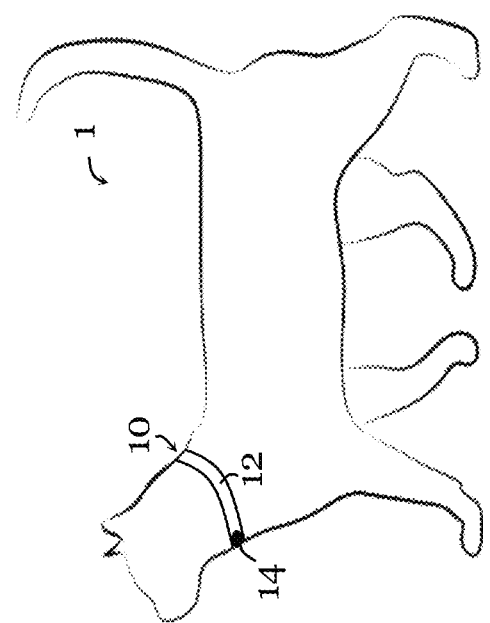
FIG. 1 is a schematic diagram of a pet wearing a pet collar.

FIG. 1 shows a pet cat 1 wearing on its neck a pet collar 10. The pet collar 10 includes a strap 12 of material connected with a buckle device 14. The buckle device 14 can be opened to remove or release the pet collar 10 from the pet's neck, or closed to wear the pet collar 10 around the pet's neck.

FIGS. 2 to 7B show a breakaway buckle device 100 for a pet collar, such as the pet collar 10 in FIG. 1, or the one in FIG. 8 described below, in a first embodiment of the invention. The breakaway buckle device 100 comprises a first buckle portion, a second buckle portion, and a coupling mechanism that is arranged to releasably couple the first buckle portion with the second buckle portion and can be manipulated to adjust a breakaway force required for the first buckle portion to break relatively away from the second buckle portion.

Figure 2:
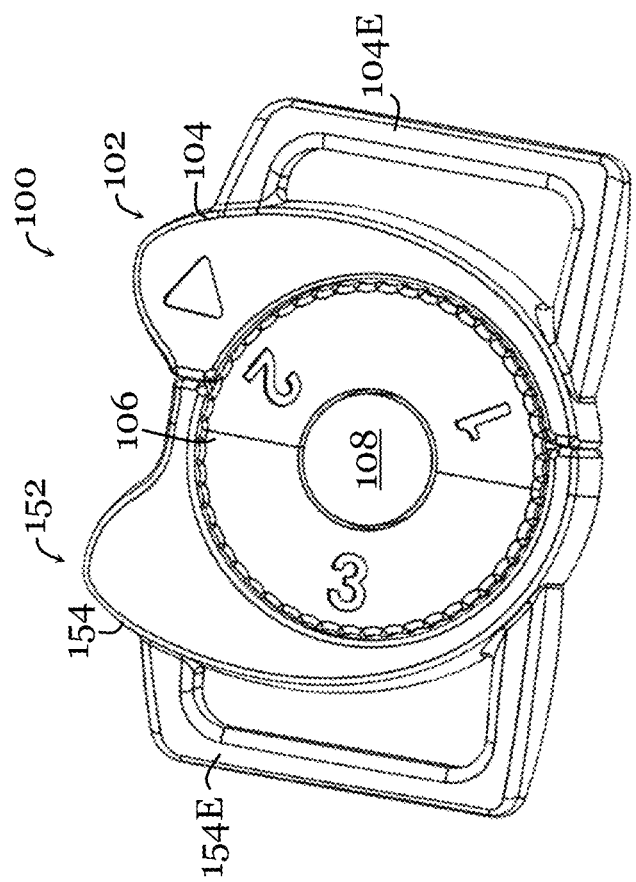
FIG. 2 is a perspective view of a breakaway buckle device for a pet collar in one embodiment of the invention.
Figure 3:
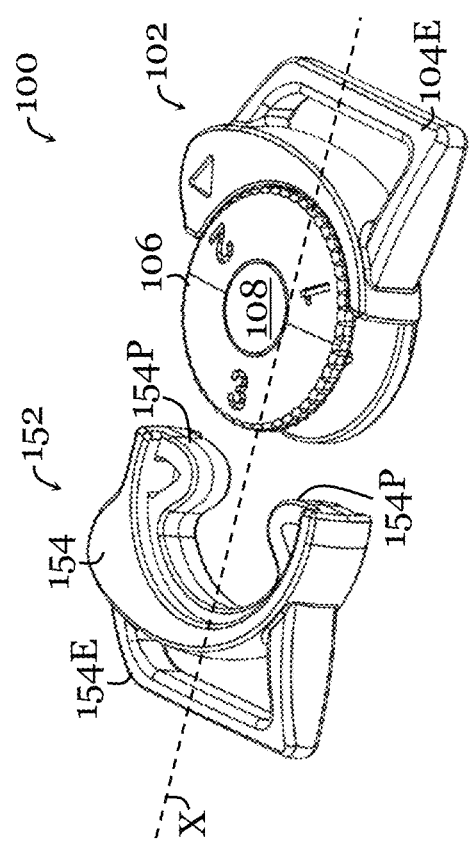
FIG. 3 is a part exploded view of the breakaway buckle device of FIG. 2.
Figure 4:
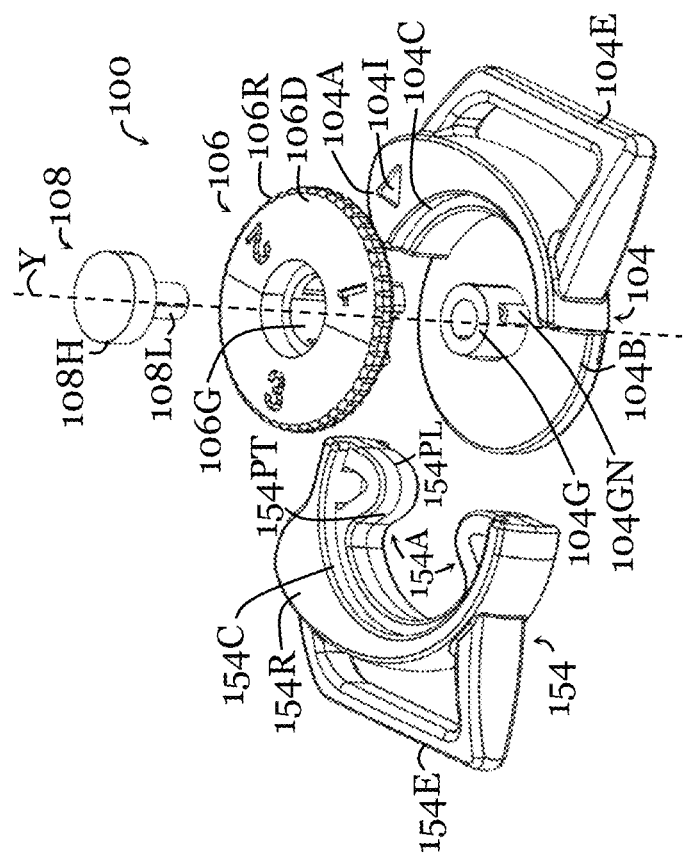
FIG. 4 is another exploded view of the breakaway buckle device of FIG. 2.

Referring to FIGS. 2 to 4, the breakaway buckle device 100 includes a first buckle portion 102 and a second buckle portion 152 releasably couplable with each other. The first and second buckle portions 102, 152, when coupled via the coupling mechanism, define a breakaway force. When an external force, in particular separation or tensile force, applied to at least one of the two buckle portions 102, 152 along a breakaway axis X reaches or exceeds the breakaway force, the two buckle portions 102, 152 will break relative away from and decouple from each other to release or open the collar.

The first buckle portion 102 includes a first buckle member 104, a rotary control member 106, and a fastener 108. The rotary control member 106 is mounted to the first buckle member 104 by the fastener 108.

The first buckle member 104 includes a body having a base portion 104B, an upstanding arcuate side portion 104A arranged at one side of the base portion 104B, and an ear portion 104E extending from the arcuate side portion 104A away from the base portion 104B. The base portion 104B has a generally rounded form, with an upwardly extending tubular guide post 104G arranged generally centrally on the upper surface of the base portion 104B. The tubular guide post 104G elongates along a rotation axis Y. The guide post 104G has an outer surface arranged to engage with the control member 106 and an inner surface defining a hole arranged to receive the fastener 108. Three angularly spaced nibs 104GN are formed on the outer surface of the guide post 104G and are distributed about the axis Y. The arcuate side portion 104A has a generally C-shaped cross section in plan view, and includes a radially-inner arcuate portion and a radially-outer arcuate portion which extend around the axis Y for the same angular extent. The height of the outer arcuate portion (as measured upwardly from the upper surface of the base portion 104B) is higher than that of the inner arcuate portion, thereby defining an arcuate channel 104C. The top surface of the radially-outer arcuate portion includes, near one end, an indicator or marker 104I. The ear portion 104E includes two generally parallel hands joined by a crossbar extending generally perpendicular to the hands. The outer arcuate portion and the ear portion 104E together define a connector, in the form of a looped portion, for receiving or mounting of a strap (not shown), such as a looped end of the strap. The first buckle member 104 may be integrally formed, e.g., using plastic material(s).

Figure 5B:
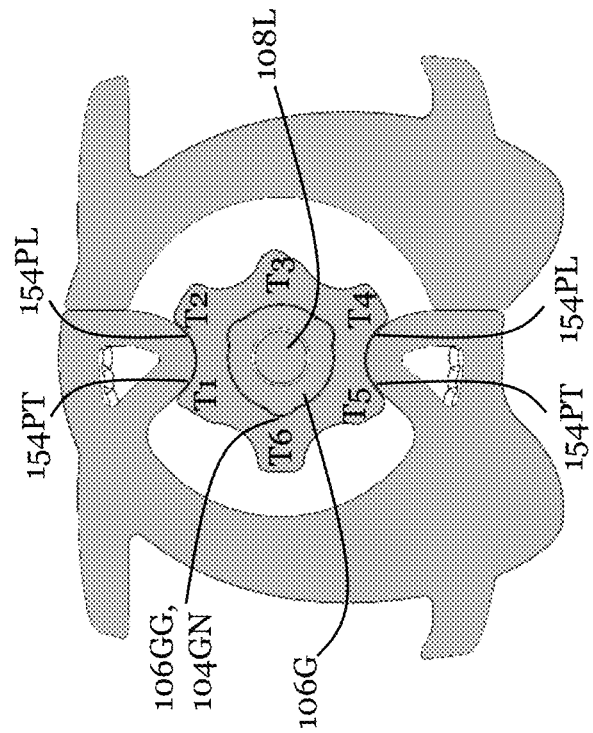
FIG. 5B is a sectional view of the breakaway buckle device of FIG. 5A.
Figure 6B:
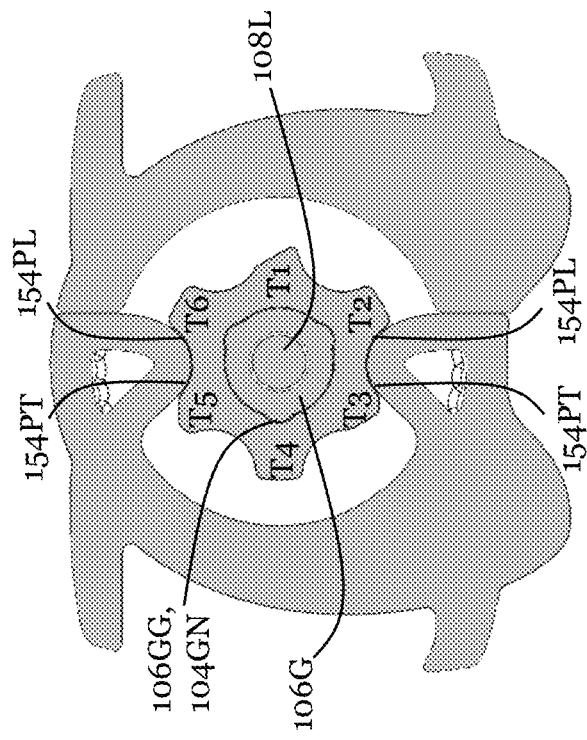
FIG. 6B is a sectional view of the breakaway buckle device of FIG. 6A.
Figure 7B:
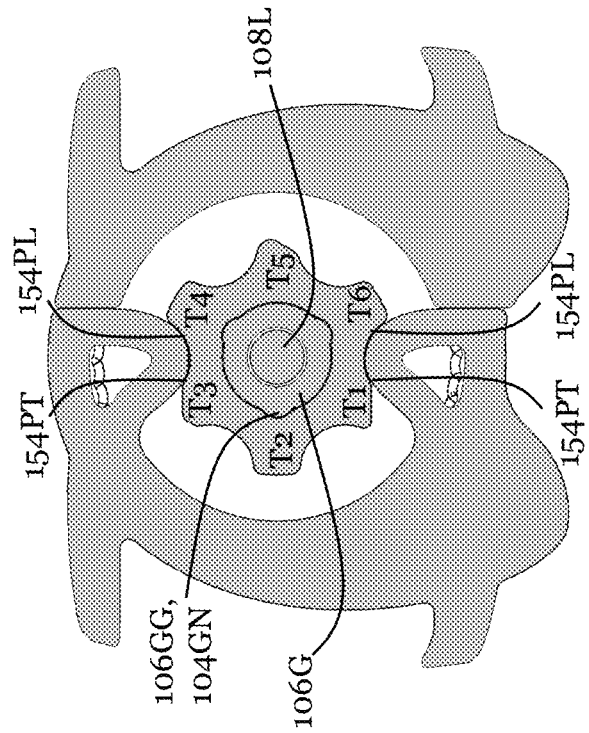
FIG. 7B is a sectional view of the breakaway buckle device of FIG. 7A.

The rotary control member 106 includes an upper annular disc portion 106D and a lower gear portion 106G with multiple circumferentially spaced gear teeth T6 of different shapes and/or sizes and corresponding grooves defined between adjacent gear teeth T1-T6. The gear portion 106G has a through-hole in communication with and generally coaxial with the hole of the upper annular disc portion 106D. The through-hole is defined by an inner surface of the lower gear portion 106G, which is generally circular and has three angularly spaced grooves 106GG complementary to the nibs 104GN. The rotary control member 106 can be non-rotatably mounted to the guide post 104G, with the nibs 104GN arranged inside the respective grooves 106GG. The rim 106R of the disc portion 106D is roughened or knurled to facilitate grip or manipulation by the user. The top surface of the disc portion 106D includes three markers, "1", "2", "3", angularly spaced apart by about 120 degrees, which correspond to the positions of different teeth and/or groove of the gear portion 106G and indicate different extents of breakaway force. The markers "1", "2", "3" may be aligned with the marker 104I to indicate a selected breakaway force. FIGS. 5B, 6B, and 7B more clearly illustrate the teeth and/or groove of the gear portion 106G. As shown in these Figures, the gear portion 106G includes six circumferentially spaced grooves defined by six circumferentially spaced teeth T1-T6. More specifically, the grooves are arranged in three pairs, each pairs respectively includes two generally-diametrically-opposed grooves of substantially the same shape and size, and the grooves of different pairs have different shapes and sizes. In this example, the groove between teeth T1 and T2 and the groove between teeth T4 and T5 form a first pair; the groove between teeth T2 and T3 and the groove between teeth T5 and T6 form a second pair; the groove between teeth T3 and T4 and the groove between teeth T6 and T1 form a third pair. The curved wall defining the groove between teeth T1 and T2 is longer than the curved wall defining the groove between teeth T2 and T3, which is in turn longer than the curved wall defining the groove between teeth T3 and T4. The rotary control member 106 may be integrally formed, e.g., using plastic material(s).

The fastener 108 may be a screw, a bolt, or the like, with a flared or larger cylindrical head 108H and a relatively narrow cylindrical leg 108L. The fastener 108 is arranged to be received by the rotary control member 106 and the base portion 104B, with its flared head 108H received in the opening defined by the rotary control member 106 and the leg 108L at least partly received in the hole of the guide post 104G. The leg 108L and the hole of the guide post 104G may include engagement features so that they threadedly engage, friction fit, snap fit, etc.

When the first buckle member 104, the rotary control member 106, and the fastener 108 are assembled together, the guide post 104G, the rotary control member 106, and the fastener 108 are coaxially arranged along the rotation axis Y, and the rotary control member 106 is rotatable relative to the first buckle member 104 and the fastener 108 about the rotation axis Y. The top surface of the fastener 108 is substantially flush with the top surface of the disc portion 106D of the rotary control member 106. A peripheral part of the disc portion 106D is arranged to be received in the arcuate channel 104C. The disc portion 106D may be thicker than the arcuate channel 104C such that the top surface of the disc portion 106D of the rotary control member 106 is higher than the top surface of the radially-outer arcuate portion and a user may contact at least part of the rim 106R of the disc portion 106D to manipulate the rotary control member 106. In this example, axis Y and axis X are generally perpendicular.

The second buckle portion 152 includes a second buckle member 154. The second buckle member 154 includes a body having an arcuate side portion 154R, and an ear portion 154E extending from the arcuate side portion 154R. The arcuate side portion 154R has a generally C-shaped cross section in plan view, and includes a radially-inner arcuate portion and a radially-outer arcuate portion which extend for the same angular extent. When the buckle portions 102, 152 are coupled, the generally C-shaped arcuate side portion 154R and the generally C-shaped arcuate side portion 104A abut each other to together define a space for receiving the rotary control member 106. The height of the outer arcuate portion is higher than that of the inner arcuate portion, thereby defining an arcuate channel 154C. The arcuate channel 154C and the arcuate channel 104C together define a generally annular channel. The radially-inner arcuate portion defines two arms 154A with radially-inwardly extending projections 154P (extending radially-inwardly towards axis Y when the buckle portions 102, 152 are coupled) that are generally diametrically opposed. The projections 154P are arranged to be received in, or engage with, one pair of generally diametrically opposed grooves of the gear portion 106G. The two arms 154A are flexible, or resilient, by virtue of their material properties and configuration (e.g., shape, size, etc.) such that they could move radially outwards under the action of a force. The ear portion 154E includes two generally parallel hands joined by a crossbar extending generally perpendicular to the hands. The outer arcuate portion and the ear portion 154E together define a connector, in the form of a looped portion, for receiving or mounting of a strap (not shown), such as a looped end of the strap. In this embodiment, the ear portions 104E, 154E are arranged at opposite ends of the breakaway buckle device 100. The second buckle member 154 may be integrally formed, e.g., using plastic material(s).

In this embodiment, the top surfaces of the arcuate side portion 104A, the arcuate side portion 154R, the rotary control member 106, and the fastener 108, together define a face portion shaped, in plan view, to correspond to an outline of a cat face. Also, the breakaway axis X is generally parallel to or coaxial with the long axis (e.g., an axis along a length) of the breakaway buckle device 100. The teeth T1-T6 (and the associated grooves) of the gear portion 106G of the rotary control member 106 and the projections 154P (or more generally the arms 154A) together define a coupling mechanism.

In use, if a user wants to decouple the two buckle portions 102, 152 that are coupled with each other, the user first applies a tensile force to these portions 102, 152 along the breakaway axis X. The tensile force, if equal to or greater than the breakaway force defined by the two buckle portions 102, 152, will cause the two buckle portions 102, 152 to break relatively away from each other. The breakaway is possible because the resilient arms 154A enable the projections 154P to move radially outwards and out of the grooves in which they are arranged as the two buckle portions 102, 152 move relatively away from each other along the breakaway axis X. In particular, as the tensile force is applied, the trailing wall portion 154PT of the projection 154P slides along the wall defining the groove to move radially outwards (due to the resilience of the arm 154A), and after the trailing wall portion 154PT clears the wall defining the groove, the projection 154P is essentially moved out of the groove, and the two buckle portions 102, 152 can be separated by applying further separation force.

On the other hand, if a user wants to couple the two buckle portions 102, 152, the user first rotates the rotary control member 106 with respect to the radially-outer arcuate portion to select one of the three groove pairs to be engaged with the projections 154P (hence set a desired breakaway force). The user can perform the selection by rotating the rotary control member 106 about axis Y and aligning one of the markers "1", "2", or "3" with the marker 104I (each of the markers correspond to a respective groove pair). Then, the user applies a compressive force along the axis X to couple the two buckle portions 102, 152. As the two buckle portions 102, 152 move relatively towards each other along the axis X, the leading wall portion 154PL of the projection 154P slides along the wall of a corresponding tooth to move radially outwards (due to the resilience of the arm 154A), and after the leading wall portion 154PL moves past the tooth, the projection 154P, under the resilience of the arm 154A, moves radially inwards and drops into the groove between two teeth, optionally producing an audible "click". In some implementations, the arms 154A or the projections 154P are sufficiently flexible such that the rotary control member 106 can be rotated to select the desired breakaway force when the two buckle portions 102, 152 are coupled with each other.

FIGS. 5A to 7B show the breakaway buckle device 100 being set at three different breakaway forces.

Figure 5A:
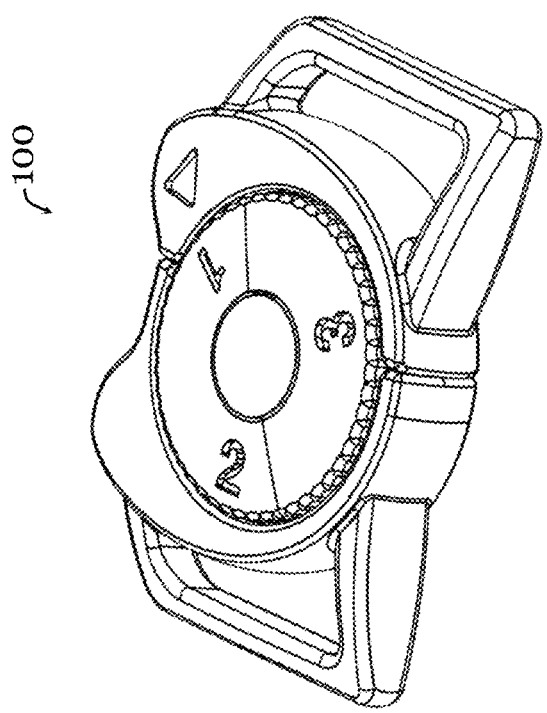
FIG. 5A is a perspective view of the breakaway buckle device of FIG. 2 arranged at a first state (defining a first breakaway force)

In FIGS. 5A and 5B, setting "1" corresponds to the largest breakaway force among the three settings, as the amount of contact between the trailing wall portion 154PT of the projection 154P and the corresponding wall portion of the groove (between teeth T1 and T2, or T4 and T5) is the largest among the three settings, hence a relatively large tensile force is required for the projection 154P to clear the groove.

Figure 6A:
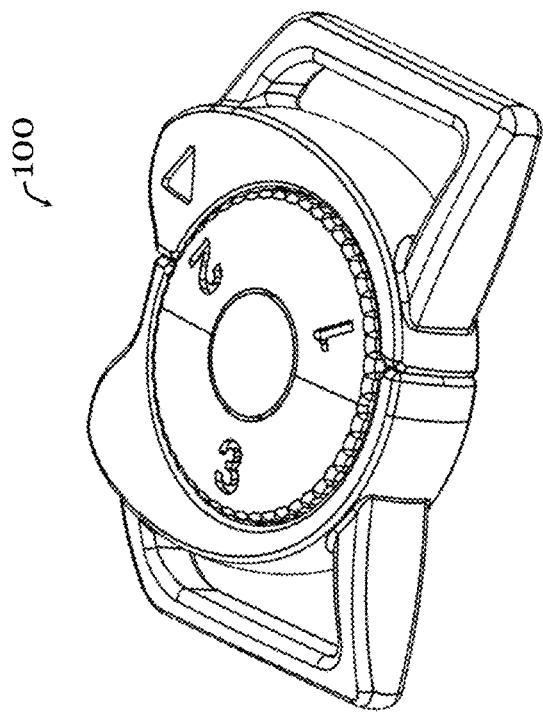
FIG. 6A is a perspective view of the breakaway buckle device of FIG. 2 arranged at a second state (defining a second breakaway force)

In FIGS. 6A and 6B, setting "2" corresponds to the medium breakaway force among the three settings, as the amount of contact between the trailing wall portion 154PT of the projection 154P and the corresponding wall portion of the groove (between teeth T1 and T2, or T4 and T5) is medium among the three settings, hence a medium amount of tensile force is required for the projection 154P to clear the groove.

Figure 7A:
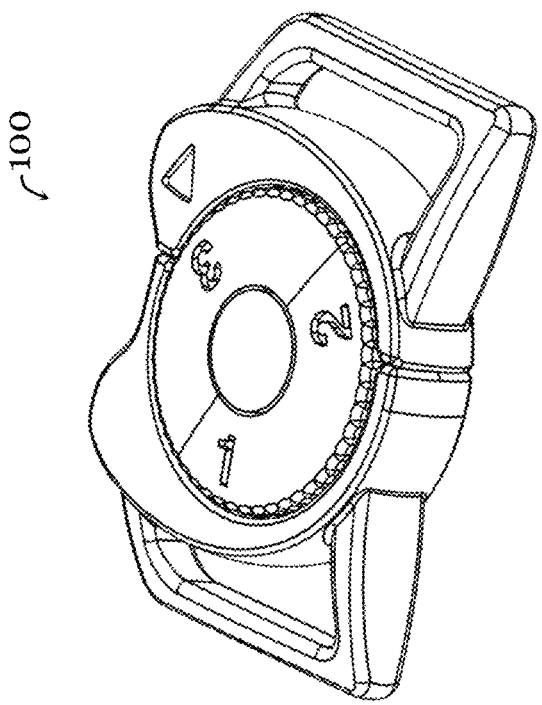
FIG. 7A is a perspective view of the breakaway buckle device of FIG. 2 arranged at a third state (defining a third breakaway force)

In FIGS. 7A and 7B, setting "3" corresponds to the smallest breakaway force among the three settings, as the amount of contact between the trailing wall portion 154PT of the projection 154P and the corresponding wall portion of the groove (between teeth T1 and T2, or T4 and T5) is the smallest among the three settings, hence a relatively small tensile force is required for the projection 154P to clear the groove.

FIGS. 8 to 10C show a breakaway buckle device 200 of a pet collar 20 in a second embodiment of the invention. The breakaway buckle device 200 comprises a first buckle portion, a second buckle portion, and a coupling mechanism that is arranged to releasably couple the first buckle portion with the second buckle portion and can be manipulated to adjust a breakaway force required for the first buckle portion to break relatively away from the second buckle portion.

Figure 8:
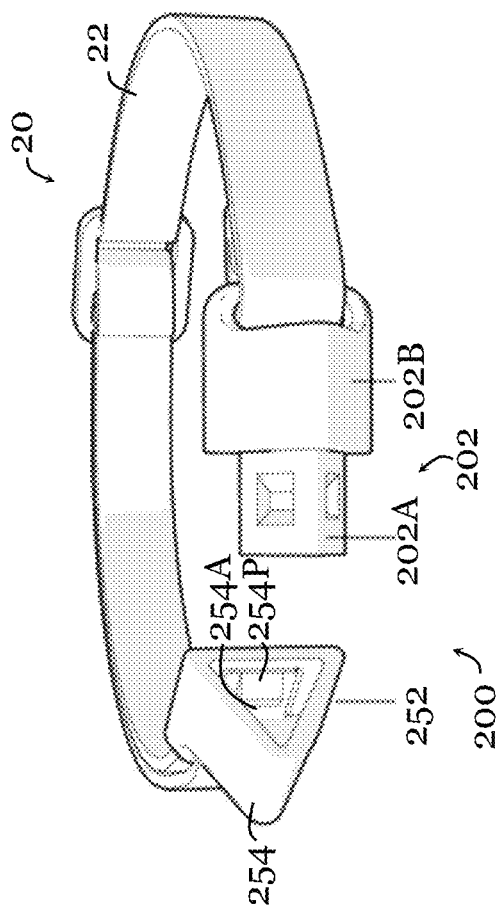
FIG. 8 is a perspective view of a pet collar with a breakaway buckle device in one embodiment of the invention.
Figure 9:
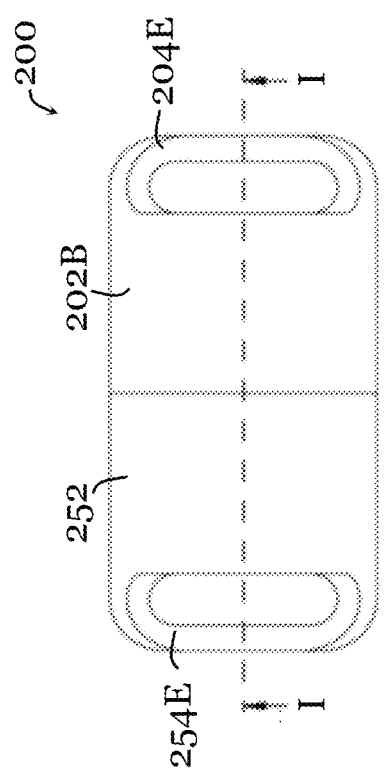
FIG. 9 is a plan view of a breakaway buckle device of the pet collar of FIG. 8 in one embodiment of the invention.

Referring to FIGS. 8 and 9, the breakaway buckle device 200 includes a first buckle portion 202 and a second buckle portion 252 each mounted at a respective end of a strap 22. The two buckle portions 202, 252 are releasably couplable with each other. The first and second buckle portions 202, 252, when coupled via the coupling mechanism, define a breakaway force. When an external force, in particular separation or tensile force, applied to at least one of the two buckle portions 202, 252 along a breakaway axis I reaches or exceeds the breakaway force, the two buckle portions 202, 252 will break relative away from and decouple from each other to release or open the collar 20.

The first buckle portion 202 comprises a first part 202A and a second part 202B movably or removably coupled with each other. The second part 202B includes an ear portion 204E with two generally parallel hands joined by a crossbar extending generally perpendicular to the hands. The second part 202B defines, through the ear portion 204E, a connector, in the form of a looped portion, for mounting the looped end of the strap. The first part 202A has a generally triangular prism shaped head part, with three faces each having a respective recess defined by wall portions. The recesses of different faces have different shapes, sizes, and/or forms. The first part 202A can act as a control member, as explained in further detail below. The first part 202A and the second part 202B may each be integrally formed, e.g., using plastic material(s).

The second buckle portion 252 comprises a second buckle member 254. The second buckle member 254 includes, at one end, an ear portion 254E with two generally parallel hands joined by a crossbar extending generally perpendicular to the hands. The second buckle member 254 defines, through the ear portion 254E, a connector, in the form of a looped portion, for mounting a looped end of the strap. The second buckle member 254 has a generally triangular prism shaped body part, but is hollow, defining an opening for receiving the first part 202A. One of the faces of the second buckle member 254 includes a cut-out defining a resilient arm 254A having an inwardly-extending projection 254P (extending towards the axis I when the buckle portions 202, 252 are coupled). The projection 254P is arranged to be selectively received, at least partly, in one of the recesses on the faces of the first part 202A, so as to define different breakaway forces, as explained in further detail below with reference to FIGS. 10A to 10C. The second buckle member may be integrally formed, e.g., using plastic material(s).

As shown in FIG. 9, the second part 202B and the second buckle portion 252 have complementary size and form. Also, the axis I is the breakaway axis and is generally parallel to or coaxial with the long axis (e.g., an axis along a length) of the breakaway buckle device 100.

Figure 10A:
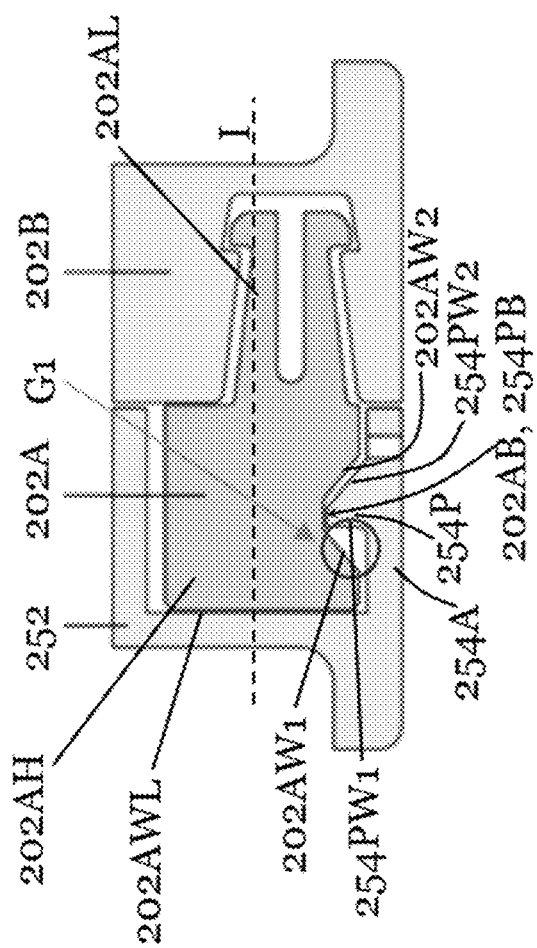
FIG. 10A is a sectional view of the breakaway buckle device in the pet collar of FIG. 9 at a first state (defining a first breakaway force), taken along line I-I in FIG. 9.
Figure 10B:
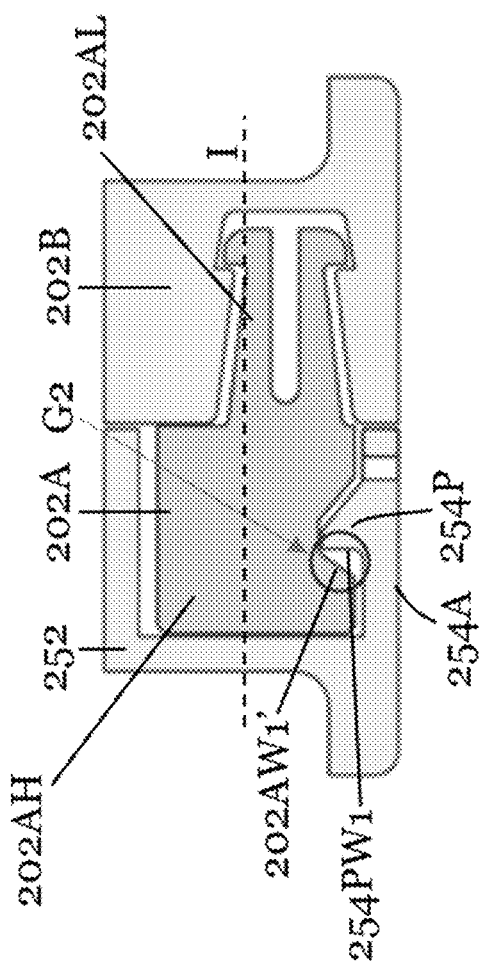
FIG. 10B is a sectional view of the breakaway buckle device in the pet collar of FIG. 9 at a second state (defining a second breakaway force), taken along line I-I in FIG. 9.
Figure 10C:
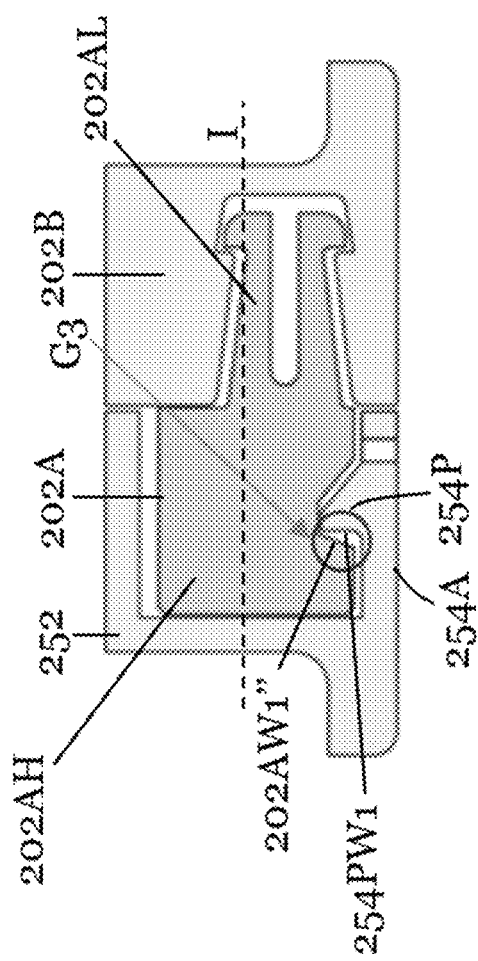
FIG. 10C is a sectional view of the breakaway buckle device in the pet collar of FIG. 9 at a third state (defining a third breakaway force), taken along line I-I in FIG. 9.

FIGS. 10A to 10C are sections taken along line I-I and they illustrate different breakaway forces defined by the buckle portions 202, 252.

Referring to FIG. 10A, the first part 202A includes the generally triangular prism shaped head part 202AH and a leg portion 202AL. The leg portion 202AL extends parallel to the axis I from the body part towards the second part 202B. The leg portion 202AL has multiple legs, which are resilient, and each of which includes a hooked portion arranged to engage with a correspondingly formed wall part of the opening in the second part 202B. The leg portion (hence the first part 202A) thus can movably or removably couple with the second part 202B to secure the first part 202A to the second part 202B. The first part 202A includes a recess defined by, at least, a slanted wall part 202AW1, a base wall part 202AB, and another slanted wall part 202AW2. The slanted wall parts 202AW1, 202AW2 are sloped towards different directions with respect to axis I. The base wall part 202AB is generally parallel to the axis I. The slanted wall part 202AW1, the base wall part 202AB, and the other slanted wall part 202AW2 in the sectional view of FIG. 10A define an inverted acute trapezoid. The arm 254A of the second buckle member 254 includes a projection 254P at one end. The projection 254P includes an end face wall part 254PW1 arranged to be in generally-facing relationship with the slanted wall part 202AW1, a base wall part 254PB arranged generally parallel to the axis I and the base wall part 202AB and engages with the base wall part 202AB, and a slanted wall part 254PW2 arranged to be in generally-facing relationship with and generally parallel to the slanted wall part 202AW2. The slanted wall part 202AW1 extends along a first axis at an angle to the axis I. The end face wall part 254PW1 extends along a second axis generally perpendicular to the axis I. The first and second axes define an acute angle. In this example, the slanted wall part 202AW1 extends at about 40 degrees with respect to the axis I, while the end face wall part 254PW1 extends at about 90 degrees with respect to the axis I. In this embodiment, the recesses (and the associated wall parts) formed on the faces of the first part 202A of the first buckle portion 202 and the projection 254P (or more generally the arm 254A) together define a coupling mechanism.

In use, if a user wants to decouple the two buckle portions 202, 252 that are coupled with each other, the user first applies a tensile force on these portions 202, 252 along the breakaway axis I. The tensile force, if equal to or greater than the breakaway force defined by the two buckle portions 202, 252, will cause the two buckle portions 202, 252 to break relatively away from each other. The breakaway is possible because the resilient arm 254A enables the projection 254P to move radially outwards (with respect to axis I) and out of the recess (on the face of the first part 202A) in which it is arranged as the two buckle portions 202, 252 move relatively away from each other along the breakaway axis I. In particular, as the tensile force is applied, the slanted wall part 202AW1 of the recess slides along the edge of the end face wall part 254PW1 to move the projection 254P radially outwards (due to the resilience of the arm 254A), and after the slanted wall part 202AW1 clears the end face wall part 254PW1, the projection 254P is essentially moved out of the way, and the two buckle portions 202, 252 can be separated by further applying separation force.

On the other hand, if a user wants to couple the two buckle portions 202, 252, the user first manipulates (e.g., removes and re-inserts) the first part 202A to the second part 202B, to select one of the three recesses to be engaged with the projection 254P (hence set a desired breakaway force). Then, the user applies a compressive force along the axis I to couple the two buckle portions 202, 252. As the two buckle portions 202, 252 move relatively towards each other along the axis I, the lower end of the leading wall portion 202AWL of the first part 202A slides along the slanted wall part 254PW2 to move the projection 254P radially outwards (away from axis I, due to the resilience of the arm 254A), and after the leading wall portion 202AWL moves past and clears the slanted wall part 254PW2 (and an initial wall section between the leading wall portion 202AWL and the slanted wall part 202AW1), the projection 254P, under the resilience of the arm 254A, moves radially inwards and drops into the recess on the face of the first part 202A, optionally producing an audible "click".

The constructions of the device 200 in the configurations of FIGS. 10B and 10C are the same as those described with reference to FIG. 10A, except that the projection 254P engages with a different recess formed on a different face of the part 202A. The operation principle in the configurations of FIGS. 10B and 10C is generally the same as that in FIG. 10A.

In FIG. 10A, the slanted wall part 202AW1 is in generally-facing relationship with the end face wall part 254PW1 of the projection 254P, with the slanted wall part 202AW1 extending at a first angle (e.g., 40 degrees) with respect to the axis I, thus forming a first gap G1 between the wall parts 202AW1 and 254PW1. This arrangement in FIG. 10A corresponds to the smallest breakaway force among the three settings, as the least tensile force along axis I is required to separate the two buckle portions 202, 252.

In FIG. 10B, the slanted wall part 202AW1' is in generally-facing relationship with the end face wall part 254PW1 of the projection 254P, with the slanted wall part 202AW1' extending at a second angle (e.g., 55 degrees) with respect to the axis I, thus forming a second gap G2 between the wall parts 202AW1' and 254PW1. The second gap G2 is smaller than the first gap G1. This arrangement in FIG. 10B corresponds to a medium breakaway force among the three settings, as a medium tensile force along axis I is required to separate the two buckle portions 202, 252.

In FIG. 10C, the slanted wall part 202AW1" is in generally-facing relationship with the end face wall part 254PW1 of the projection 254P, with the slanted wall part 202AW1" extending at a third angle (e.g., 70 degrees) with respect to the axis I, thus forming a third gap G3 between the wall parts 202AW1" and 254PW1. The third gap G3 is smaller than the second gap G2. This arrangement in FIG. 10C corresponds to the largest breakaway force among the three settings, as the most tensile force along axis I is required to separate the two buckle portions 202, 252.

FIGS. 11 to 17B show a breakaway buckle device 300 for a pet collar, such as the one in FIG. 1, or the one in FIG. 8, in a third embodiment of the invention. The breakaway buckle device 300 comprises a first buckle portion, a second buckle portion, and a coupling mechanism that is arranged to releasably couple the first buckle portion with the second buckle portion and can be manipulated to adjust a breakaway force required for the first buckle portion to break relatively away from the second buckle portion.

Referring to FIGS. 11 to 14, the breakaway buckle device 300 includes a first buckle portion 302 and a second buckle portion 352. The two buckle portions 302, 352 are releasably couplable with each other. The first and second buckle portions 302, 352, when coupled via the coupling mechanism, define a breakaway force. When an external force, in particular separation or tensile force, applied to at least one of the two buckle portions 302, 352 along a breakaway axis J reaches or exceeds the breakaway force, the two buckle portions 302, 352 will break relative away from and decouple from each other to release or open the collar.

The first buckle portion 302 comprises a first part 302A and a second part 302B movably or removably coupled with each other. In this embodiment the first part 302A is rotatable relative to the second part 302B about the axis J, which in this example is also the breakaway axis. The second part 302B includes a body with an ear portion 302E with two generally parallel hands joined by a crossbar extending generally perpendicular to the hands. The second part 302B defines, through the ear portion 302E, a connector, in the form of a looped portion, for mounting the looped end of the strap. The body of the second part 302B defines a cavity 302C for rotatably receiving a leg portion 302AL of the first part 302A. The first part 302A is mushroom-like, with a generally dome-shaped head part 302AH and a leg portion 302AL extending from the head part 302AH. The generally dome-shaped head part 302AH is arranged to be received in the cavity 352C defined by the second buckle portion 352 whereas the leg portion 302AL is arranged to be received in a cavity 302C defined by the second part 302B of the first buckle portion 302. The generally dome-shaped head part 302AH includes, on its surface, three circumferentially distributed and axially extending recesses 302AR, e.g., distributed about axis J, and each having, axially adjacent it, a respective marker "1", "2", or "3", for indicating the different selections of breakaway force. The recesses 302AR have different shapes, sizes, and/or forms. The first part 302A can act as a control member, as explained in further detail below. The first part 302A and the second part 302B may each be integrally formed, e.g., using plastic material(s).

The second buckle portion 352 comprises a second buckle member 354. The body of the second buckle member 354 defines a cavity 352C for receiving the generally dome-shaped head part 302AH of the first part 302A. The body of the second buckle member 354 includes a cut-out defining a resilient arm 354A having an inwardly-extending projection 354P (extending towards the axis J when the buckle portions 302, 352 are coupled). The projection 354P is arranged to be selectively received, at least partly, in one of the recesses 302AR on the surface of the first part 302A, so as to define different breakaway forces, as explained in further detail below with reference to FIGS. 15A to 17C. The second buckle member 354 may be integrally formed, e.g., using plastic material(s).

Figure 11:
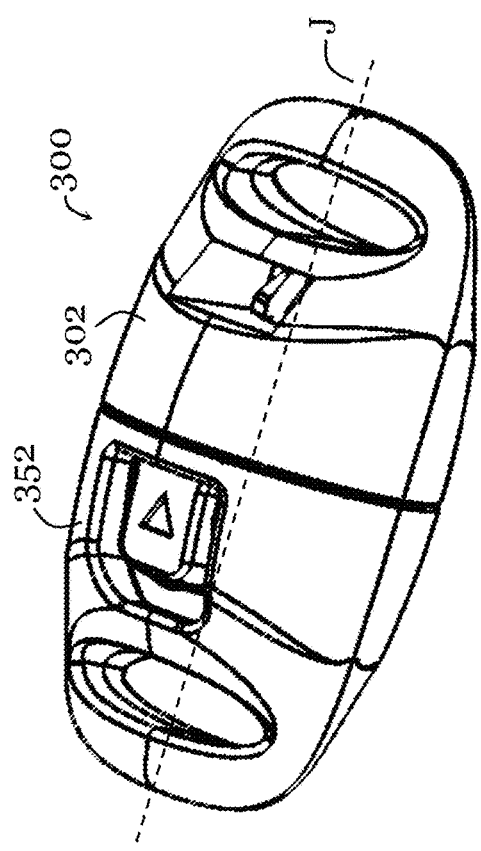
FIG. 11 is a perspective view of a breakaway buckle device for a pet collar in one embodiment of the invention.
Figure 12:
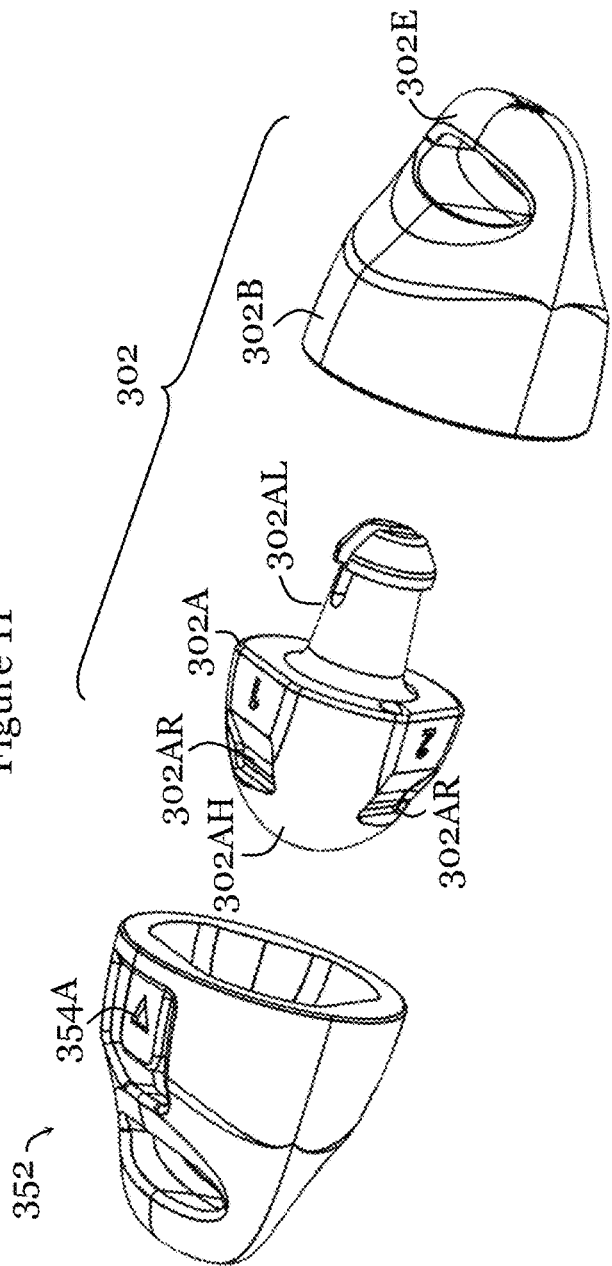
FIG. 12 is an exploded view of the breakaway buckle device of FIG. 11.
Figure 14:
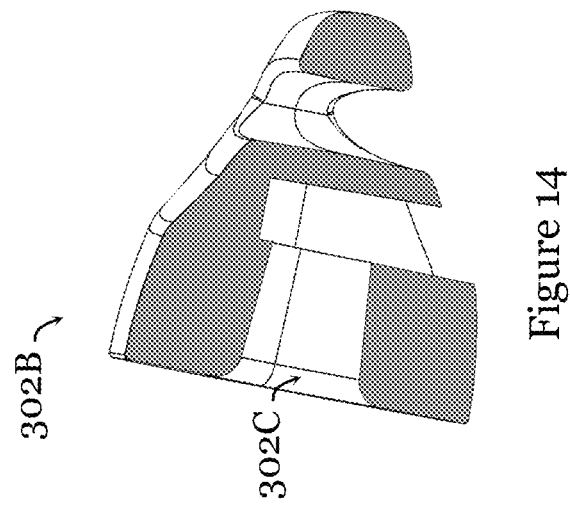
FIG. 14 is a cut-away sectional view of another member of the breakaway buckle device of FIG. 11.
Figure 13:
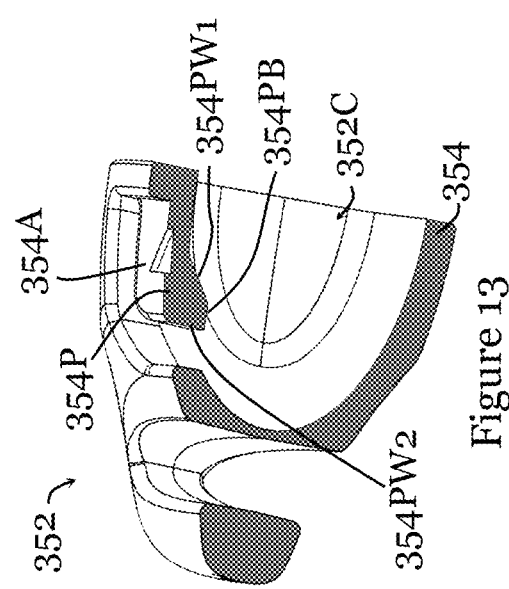
FIG. 13 is a cut-away sectional view of a member of the breakaway buckle device of FIG. 11.

As shown in FIGS. 11 and 12, the second part 302B of the first buckle portion 302 and the second buckle portion 352 have complementary size and shape. The first part 302A is substantially enclosed by the second part 302B of the first buckle portion 302 and the second buckle portion 352. Also, the axis J is the breakaway axis, as well as the rotation axis of the first part 302A relative to the second part 302B, and is generally parallel to or coaxial with the long axis (e.g., an axis along a length) of the breakaway buckle device 300.

Figure 15A:
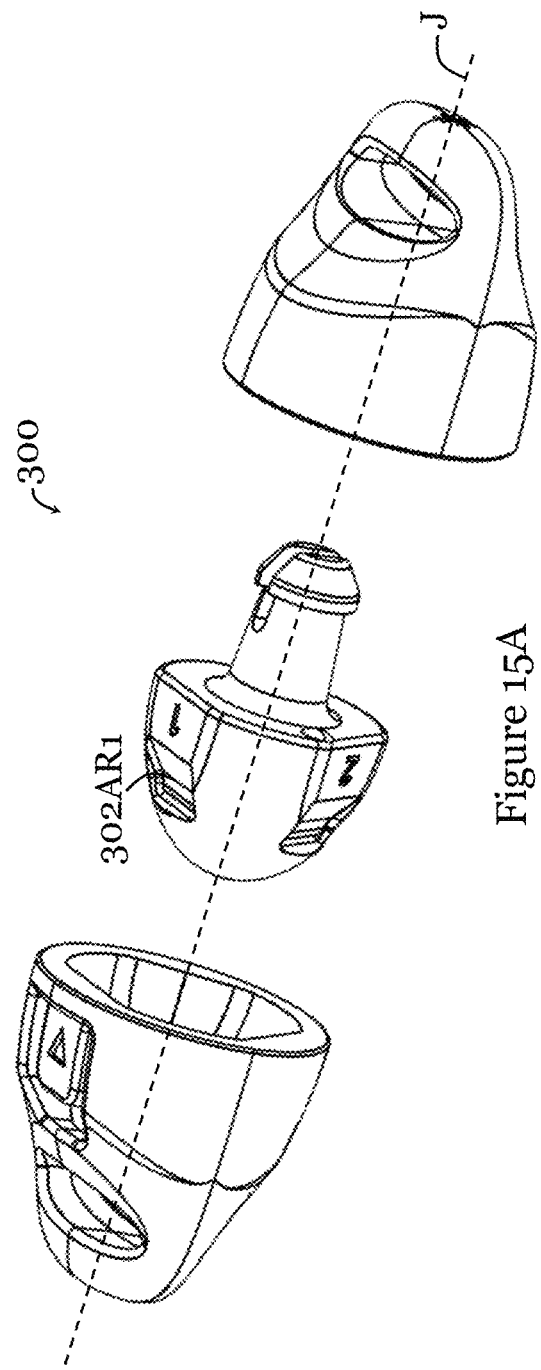
FIG. 15A is an exploded view of the breakaway buckle device of FIG. 11 arranged at a first state (defining a first breakaway force)
Figure 15B:
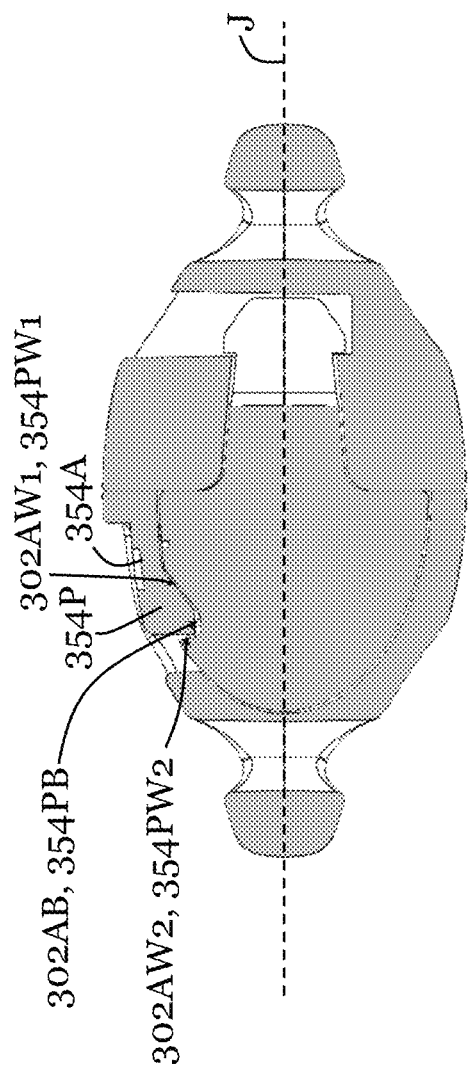
FIG. 15B is a sectional view of the breakaway buckle device of FIG. 15A.

Referring to FIGS. 12, 13, 15A, and 15B, the leg portion 302AL of the first part 302A extends parallel to the axis J towards the second part 302B. The leg portion 302AL has multiple legs, which are resilient, and each of which includes a hooked portion arranged to engage with a correspondingly formed wall part of the cavity in the second part 302B. The leg portion (hence the first part 302A) thus can movably or removably couple with the second part 302B to secure the first part 302A to the second part 302B. In FIGS. 15A and 15B, the first part 302A includes a recess 302AR1 defined by, at least, a slanted wall part 302AW1, a base wall part 302AB, and another slanted wall part 302AW2. The slanted wall parts 302AW1, 302AW2 are sloped towards different directions. The base wall part 302AB is generally parallel to the axis J. The arm 354A of the second buckle member 354 includes a radially-inward projection 354P (projecting radially inward towards axis J) at one end. The projection 354P includes a slanted wall part 354PW1 arranged to engage with the slanted wall part 302AW1, a base wall part 354PB arranged generally parallel to the axis J and the base wall part 302AB and engages with the base wall part 302AB, and an end face wall part 354PW2 arranged to be in generally-facing relationship with the slanted wall part 302AW2. The slanted wall part 302AW1 extends generally along a first axis at an angle to the axis J. The end face wall part 354PW2 extends along a second axis generally perpendicular to the axis J. The first and second axes define an acute angle. In this embodiment, the recesses (and the associated wall parts) formed on the surface of the first part 302A of the first buckle portion 302 and the projection 354P (or more generally the arm 354A) together define a coupling mechanism.

In use, if a user wants to decouple the two buckle portions 302, 352 that are coupled with each other, the user first applies a tensile force on these portions 302, 352 along the breakaway axis J. The tensile force, if equal to or greater than the breakaway force defined by the two buckle portions 302, 352, will cause the two buckle portions 302, 352 to break relatively away from each other. The breakaway is possible because the resilient arm 354A enables the projection 354P to move radially outwards (with respect to axis J) and out of the recess 302AR in which it is arranged as the two buckle portions 302, 352 move relatively away from each other along the breakaway axis J. In particular, as the tensile force is applied, the slanted wall part 302AW2 of the recess 302AR slides along the edge of the end face wall part 354PW2 to move the projection 354P radially outwards (due to the resilience of the arm 354A), and after the slanted wall part 302AW2 clears the end face wall part 354PW2, the projection 354P is essentially moved out of the way, and the two buckle portions 302, 352 can be separated by further applying separation force.

On the other hand, if a user wants to couple the two buckle portions 302, 352, the user first manipulates (e.g., rotates) the first part 302A relative to the second part 302B, to select one of the three recesses to be engaged with the projection 354P (hence set a desired breakaway force). Then, the user applies a compressive force along the axis J to couple the two buckle portions 302, 352. As the two buckle portions 302, 352 move relatively towards each other along the axis J, the tip of the generally dome-shaped head part 302AH of the first part 302A slides along the slanted wall part 354PW1 to move the projection 354P radially outwards (away from axis J, due to the resilience of the arm 354A), and after the tip of the generally dome-shaped head part 302AH moves past and clears the slanted wall part 354PW1, the projection 354P, under the resilience of the arm 354A, moves radially inwards and drops into the selected recess 302AR1 of the first part 302A, optionally producing an audible "click".

The constructions of the device 300 in the configurations of FIGS. 16A to 17B are the same as those described with reference to FIGS. 15A to 15B, except that the projection 354P engages with a different recess formed on the surface of the first part 302A. The operation principle in the configurations of FIGS. 16A to 17B is generally the same as that in FIGS. 15A and 15B.

In FIGS. 15A and 15B, setting "1", the slanted wall part 302AW2 is in generally-facing relationship with the end face wall part 354PW2 of the projection 354P, and the slanted wall part 302AW2 extends at a first angle (e.g., 80 degrees) with respect to the axis J, thus forming a first gap between the wall parts 302AW1 and 354PW1. This arrangement in FIGS. 15A and 15B corresponds to the largest breakaway force among the three settings, as the largest tensile force along axis J is required to separate the two buckle portions 302, 352.

In FIGS. 16A and 16B, setting "2", the slanted wall part 302AW2' is in generally-facing relationship with the end face wall part 354PW2 of the projection 354P, and the slanted wall part 302AW2' extends at a second angle (e.g., 65 degrees) with respect to the axis J, thus forming a second gap between the wall parts 302AW1' and 354PW1. The second angle is smaller than the first angle and the second gap is larger than the first gap. This arrangement in FIGS. 16A and 16B corresponds to the medium breakaway force among the three settings, as a medium tensile force along axis J is required to separate the two buckle portions 302, 352.

Figure 17A:
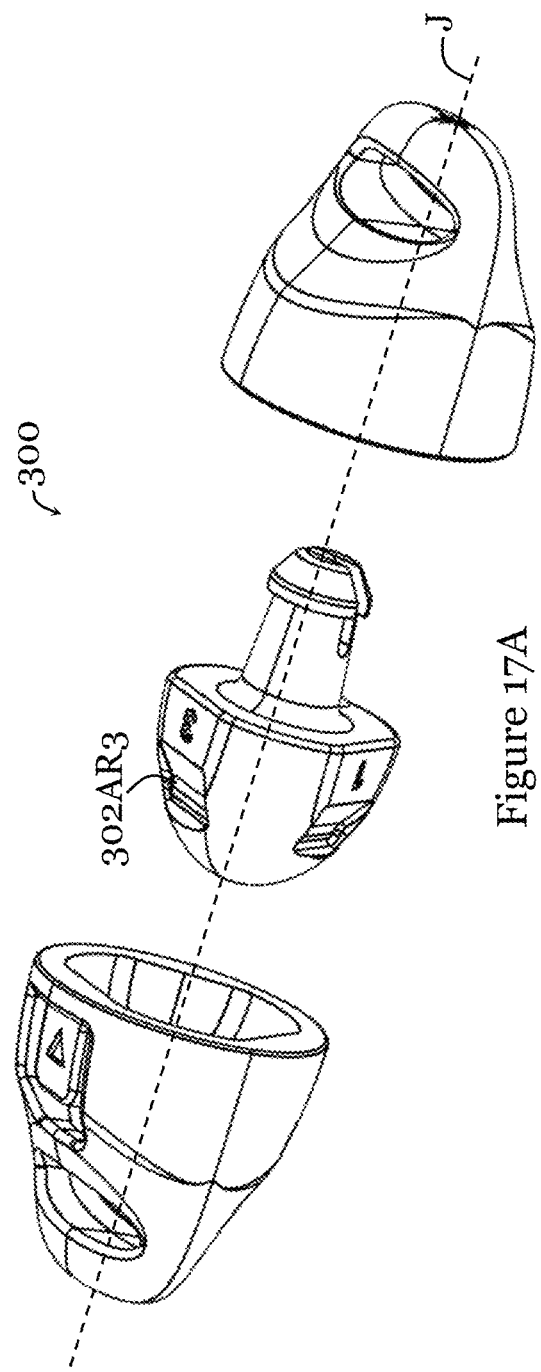
FIG. 17A is an exploded view of the breakaway buckle device of FIG. 11 arranged at a third state (defining a third breakaway force)
Figure 17B:
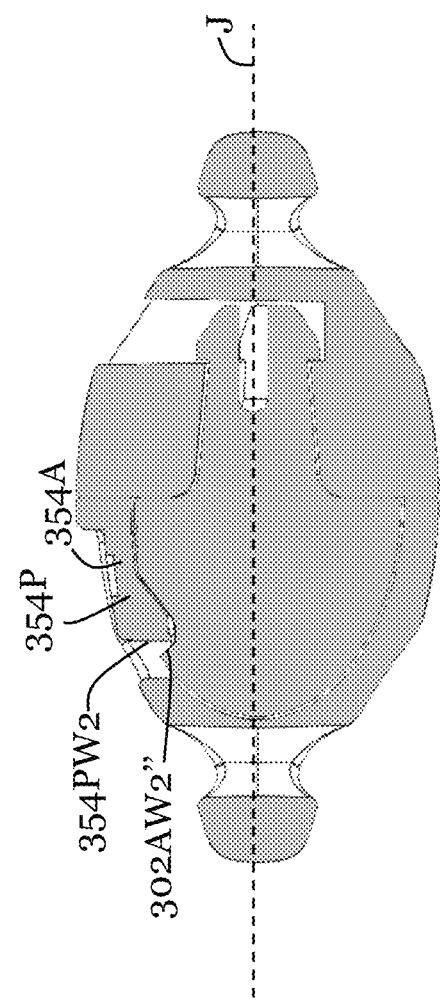
FIG. 17B is a sectional view of the breakaway buckle device of FIG. 17A.

In FIGS. 17A and 17B, setting "3", the slanted wall part 302AW2" is in generally-facing relationship with the end face wall part 354PW2 of the projection 354P, and the slanted wall part 302AW2" extends at a third angle (e.g., 50 degrees) with respect to the axis J, thus forming a third gap between the wall parts 302AW1" and 354PW1. The third angle is smaller than the second angle and the third gap is larger than the second gap. This arrangement in FIGS. 17A and 17B corresponds to the smallest breakaway force among the three settings, as the least tensile force along axis J is required to separate the two buckle portions 302, 352.

Figure 18A:
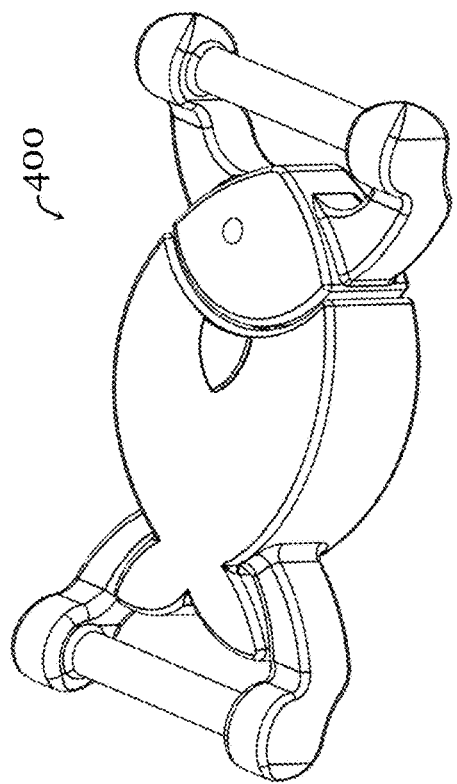
FIG. 18A is a perspective view of a breakaway buckle device for a pet collar in one embodiment of the invention.
Figure 18B:
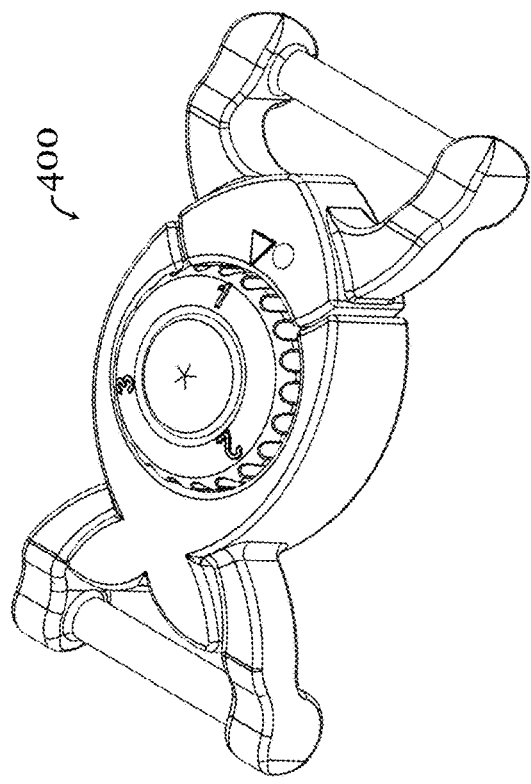
FIG. 18B is another perspective view of the breakaway buckle device of FIG. 18A.

FIGS. 18A and 18B show a breakaway buckle device 400 for a pet collar, such as the ones in FIGS. 1 and 8, in a fourth embodiment of the invention. The breakaway buckle device 400 comprises a first buckle portion, a second buckle portion, and a coupling mechanism that is arranged to releasably couple the first buckle portion with the second buckle portion and can be manipulated to adjust a breakaway force required for the first buckle portion to break relatively away from the second buckle portion. The breakaway buckle device 400 is similar to the breakaway buckle device 100. In particular, the coupling mechanism of the breakaway buckle device 400 is the same as the coupling mechanism of the breakaway buckle device 100. The main difference between the breakaway buckle device 400 and the breakaway buckle device 100 is in the outlook (shape and form). In particular, the breakaway buckle device 400 has a face portion is shaped, in plan view, to correspond to an outline of a fish, not a cat face.

Figure 19A:
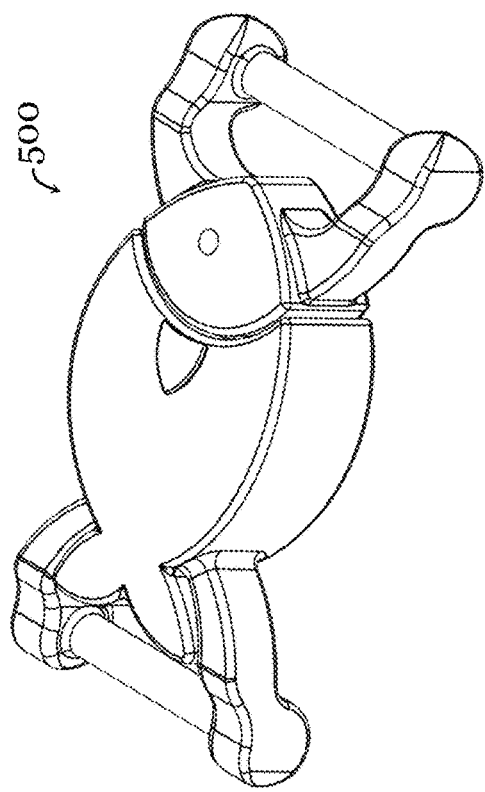
FIG. 19A is a perspective view of a breakaway buckle device for a pet collar in one embodiment of the invention.
Figure 19B:
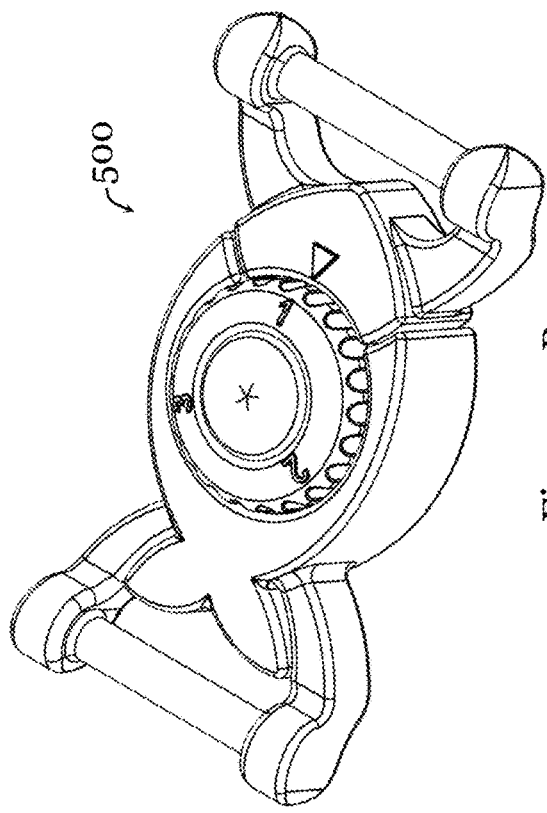
FIG. 19B is another perspective view of the breakaway buckle device of FIG. 19A.

FIGS. 19A and 19B show a breakaway buckle device 500 for a pet collar, such as the ones in FIGS. 1 and 8, in a fifth embodiment of the invention. The breakaway buckle device 500 comprises a first buckle portion, a second buckle portion, and a coupling mechanism that is arranged to releasably couple the first buckle portion with the second buckle portion and can be manipulated to adjust a breakaway force required for the first buckle portion to break relatively away from the second buckle portion. The breakaway buckle device 500 is similar to the breakaway buckle device 400. In particular, the coupling mechanism of the breakaway buckle device 500 is the same as the coupling mechanism of the breakaway buckle device 400. The main difference between the breakaway buckle device 500 and the breakaway buckle device 400 is in the outlook (shape and form). In particular, the rotary control member of the breakaway buckle device 400 and the rotary control member of the breakaway buckle device 500 are arranged in opposite sides or faces of the device.

It will be appreciated by persons skilled in the art that numerous variations and/or modifications may be made to the embodiments of the invention as shown to provide other embodiments of the invention. The described embodiments of the invention should therefore be considered in all respects as illustrative and not restrictive. Example optional features of some aspects of the invention are set forth in the summary section above. Some embodiments of the invention may include one or more of these optional features (some of which are not specifically illustrated in the drawings). Some embodiments of the invention may lack one or more of these optional features (some of which are not specifically illustrated in the drawings). One or more features in one embodiment and one or more features in another embodiment may be combined to provide further embodiment(s) of the invention.

For example, the breakaway buckle device can be made in a different shape, size, form, and/or color, as appropriate, so long as it includes a first buckle portion, a second buckle portion, and a coupling mechanism arranged to releasably couple the first buckle portion with the second buckle portion and can be manipulated to adjust a breakaway force required for the first buckle portion to break relatively away from the second buckle portion. The adjustment of the breakaway force may be stepped (any number of two or more steps) or stepless. The breakaway axis may be the same as the coupling axis of the two buckle portions.

In some embodiments, the breakaway buckle device is additively manufactured using an additive manufacturing machine, e.g., 3D printed using a 3D printer.

While the breakaway buckle device embodiments described and/or illustrated herein are for use with a pet collar, it is envisioned that in some instances the breakaway buckle device can be modified and used in other applications (not as part of a pet collar). In one instance, the breakaway buckle device may be arranged around the wrist, the head, the body, the tail, etc. of an animal. In another instance, the breakaway buckle device may be used in backpacks, harnesses, bags, belts, and/or other applications.

The invention claimed is:

1. A breakaway buckle device for a pet collar, comprising:
a first buckle portion comprising a first part and a second part rotatable relative to the first part about a rotation axis, the second part comprising a head part and a leg portion;
a second buckle portion; and
a coupling mechanism arranged to releasably couple the first buckle portion with the second buckle portion and arranged to be manipulated for adjusting a breakaway force required for the first buckle portion to break relatively away from the second buckle portion along a breakaway axis generally parallel to or coaxial with the rotation axis;
wherein the coupling mechanism comprises
a plurality of engagement portions arranged at one of the head part of the second part; and
a corresponding engagement portion arranged at and the second buckle portion;
wherein the corresponding engagement portion is arranged to selectively engage with one of the plurality of engagement portions to releasably lock the first buckle portion and the second buckle portion and to define a respective breakaway force;
wherein
the first part defines a cavity for receiving the leg portion of the second part,
the second buckle portion defines a cavity for receiving the head part of the second part, and
the second part is substantially enclosed by the first part and the second buckle portion when the first buckle portion and the second buckle portion are releasably coupled.

2. The breakaway buckle device of claim 1, wherein the plurality of engagement portions are recesses, and wherein the corresponding engagement portion is a protrusion arranged to selectively extend at least partly into one of the recesses.

3. The breakaway buckle device of claim 1, wherein the plurality of engagement portions comprise circumferentially distributed recesses and the corresponding engagement portion comprises a projection on a resilient arm; and
wherein the circumferentially distributed recesses are distributed about the rotation axis.

4. The breakaway buckle device of claim 3, wherein each of the circumferentially distributed recesses includes a respective end wall and the projection includes an end face arranged to be in generally-facing relationship selectively with each respective end wall; and
wherein each of the end walls extends generally along a respective first axis, the first axes of the end walls are not parallel with each other, the end face extends generally along a second axis, and, for each of the first axes, a respective acute angle is defined between a corresponding first axis and the second axis.

5. The breakaway buckle device of claim 4, wherein the second axis is generally perpendicular to the breakaway axis.

6. The breakaway buckle device of claim 1, wherein the breakaway axis is generally parallel to or coaxial with a long axis of the breakaway buckle device.

7. The breakaway buckle device of claim 1, further comprising an indicator arranged to provide an indication of a selected breakaway force associated with the first and second buckle portions.

8. The breakaway buckle device of claim 7, wherein the indicator is provided on the head part of the second part.

9. The breakaway buckle device of claim 7, wherein the indicator is stamped, engraved, impressed, or integrally formed on the head part of the second part.

10. The breakaway buckle device of claim 7, wherein the indicator is hidden from view when the first buckle portion and the second buckle portion are releasably coupled.

11. The breakaway buckle device of claim 1, wherein the first buckle portion and the second buckle portion together define a face portion shaped to correspond to an outline of at least part of an animal.

12. The breakaway buckle device of claim 1, wherein the head part is a generally dome-shaped head part.

13. A pet collar comprising the breakaway buckle device of claim 1.

14. A pet collar kit comprising:
the breakaway buckle device of claim 1; and
one or more straps removably connectable with, or non-removably connected with, the breakaway buckle device.

\* \* \* \* \*